United States Patent
Kishore et al.

(10) Patent No.: US 9,762,497 B2
(45) Date of Patent: Sep. 12, 2017

(54) SYSTEM, METHOD AND APPARATUS FOR NETWORK CONGESTION MANAGEMENT AND NETWORK RESOURCE ISOLATION

(71) Applicant: Avago Technologies General IP (Singapore) Pte. Ltd., Singapore (SG)

(72) Inventors: Karagada Ramarao Kishore, Saratoga, CA (US); Ariel Hendel, Cupertino, CA (US); Mohan Venkatachar Kalkunte, Saratoga, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 163 days.

(21) Appl. No.: 14/155,654

(22) Filed: Jan. 15, 2014

(65) Prior Publication Data
US 2015/0146527 A1    May 28, 2015

Related U.S. Application Data

(60) Provisional application No. 61/908,945, filed on Nov. 26, 2013.

(51) Int. Cl.
*H04L 12/851* (2013.01)
*H04L 12/801* (2013.01)

(52) U.S. Cl.
CPC ........ *H04L 47/2441* (2013.01); *H04L 47/115* (2013.01)

(58) Field of Classification Search
CPC ................ H04L 47/2441; H04L 47/115
See application file for complete search history.

(56) References Cited

U.S. PATENT DOCUMENTS

| | | | |
|---|---|---|---|
| 7,911,960 B1 * | 3/2011 | Aydemir | H04L 47/266 370/230 |
| 2004/0024904 A1 * | 2/2004 | DiMambro | H04L 67/1002 709/238 |
| 2006/0050722 A1 * | 3/2006 | Bury | H04L 49/9031 370/403 |
| 2008/0198746 A1 * | 8/2008 | Kwan | H04L 47/10 370/231 |
| 2013/0208671 A1 * | 8/2013 | Royz | H04L 25/00 370/329 |
| 2014/0215463 A1 | 7/2014 | Hendel et al. | |
| 2014/0269321 A1 * | 9/2014 | Kamble | H04L 47/31 370/236 |

* cited by examiner

*Primary Examiner* — Hoon J Chung
*Assistant Examiner* — Zhensheng Zhang
(74) *Attorney, Agent, or Firm* — Foley & Lardner LLP

(57) ABSTRACT

System, method and apparatus for network congestion management and network resource isolation. A high level network usage and device architecture is provided that can satisfy buffering and network bandwidth resource management for data center networks. The congestion management can be defined to bring the reaction point closer to the network ports. In one embodiment, the reaction point is resident in a network interface card (NIC).

17 Claims, 7 Drawing Sheets

SYSTEM, METHOD AND APPARATUS FOR NETWORK CONGESTION MANAGEMENT AND NETWORK RESOURCE ISOLATION

This application claims priority to provisional application No. 61/908,945, filed Nov. 26, 2013, which is incorporated herein by reference in its entirety.

BACKGROUND

Field of the Invention

The present invention relates generally to data center networks and, more particularly, to a system, method and apparatus for network congestion management and network resource isolation.

INTRODUCTION

Network resource isolation and congestion management is a significant concern for today's data center networks. In one example, a large data center networks can be built around L3 (Layer 3) interconnected servers using high volume network building blocks at server-connecting leaf switches, and sometimes even at leaf-switch-connecting spine switches. Together, the leaf and spine switch architecture can enable a scalable data center network fabric.

Multi-tenant data center networks are required to provide resource isolation so that per tenant policy and service level agreements (SLAs) can be meaningfully applied, to reduce the average as well as tail latency between communicating servers, and to minimize packet drops as they affect both latency and throughput. These drops ordinarily are a result of buffer congestion in the data center network.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which is illustrated, in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Although congestion control has been within the scope of network and transport layer design over the years, the introduction of virtualization presents new challenges. For example, TCP based congestion control, either in the form of per-connection congestion avoidance, or the modified data center TCP (DCTCP), rely on the protocol stack of guest virtual machines (VMs) to implement its reaction point. This is problematic because the reaction point control is not the same as the resource management point, and the VM tenant is not under the control of the infrastructure owner. Further, a reaction point in the VM also implies a longer control loop.

In accordance with the present invention, a high level network usage and device architecture is provided that can satisfy buffering and network bandwidth resource management for data center networks. It is a feature of the present invention that the congestion management of the present invention is defined to bring the reaction point closer to the network ports. In one embodiment, the reaction point is resident in a network interface card (NIC).

The device architecture of the present invention can improve upon network resource management and policy enforced in virtualized environments through software-based virtual switches that reside within or are associated with a hypervisor controlling the physical machine. Here it should be noted that reliance on congestion management in virtual switches would preclude the leveraging of valuable performance optimizations based on direct VM to NIC data movement like single-root I/O virtualization (SR-IOV) network interfaces. As will be described in greater detail below, the device architecture of the present invention can leverage such direct VM data paths while bringing the reaction point closer to the network ports.

Figure 1:
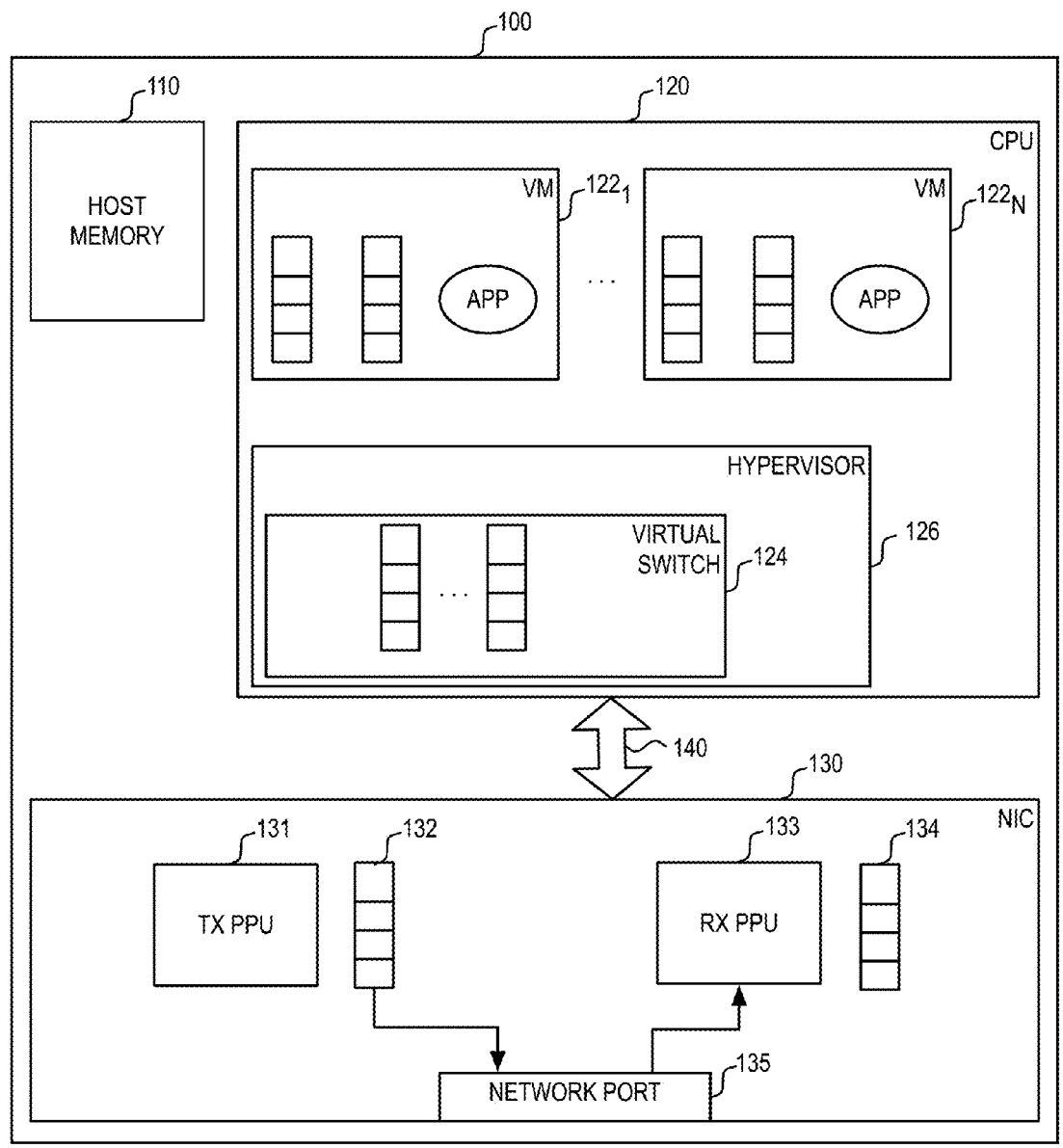
FIG. 1 illustrates a block diagram of an example endpoint device according to the present invention.

FIG. 1 illustrates a block diagram of an example endpoint device (e.g., server) according to the present invention. In general, an endpoint device can implement a plurality of virtual machines that can provide network services for various clients. As illustrated, server 100 includes host memory 110, CPU 120, and NIC 130. NIC 130 can be communicatively coupled to CPU 120 via bus 140 (e.g., a peripheral component interconnect (PCI) bus, a PCI express bus, etc.).

CPU 120 of endpoint device 100 can include the implementation of one or more VMs $122_1$-$122_N$, and hypervisor 126 for managing the execution of guest operating systems running on VMs $122_1$-$122_N$. As illustrated, hypervisor 126 includes virtual switch 124 which is configured to manage the networking interface between VMs $122_1$-$122_N$ and a physical network. In particular, virtual switch 124 can be configured to manage packets being sent from and/or to VMs $122_1$-$122_N$. For example, virtual switch 124 can be configured to analyze the packets, modify the packets, drop the packets, return the packets to their sources, route the packets to their destinations, control the packets, etc.

As further illustrated, each of the VMs $122_1$-$122_N$ can further include applications being run on the VM, one or more transmit queues for transmitting packets, and one or more receive queues for receiving packets. As noted, hypervisor 126 includes virtual switch 124, which can manage packets being sent from and/or to VMs $122_1$-$122_N$. Virtual switch 124 can also be configured to operate its own transmit queues and receive queues. As would be appreciated, virtual switch 124 can be configured to operate separate transmit and receive queues for each of VMs $122_1$-$122_N$.

As illustrated, virtual switch 124 can be configured to route a packet from VMs $122_1$-$122_N$ to various destination via NIC 130. NIC 130 includes transmit packet processing unit (TX PPU) 131, outbound queue 132, receive packet processing unit (RX PPU) 133, inbound queue 134, and network port 135.

In general, TX PPU 131 can be configured to receive outbound packets, analyze the packets, modify the packets, drop the packets, return the packets to their sources, route the packets to their destinations, control the packets, etc. As will be described in greater detail below, if TX PPU 131 determines that an outbound packet should be routed to its destination, TPPU 226 can be configured to place this packet in outbound queue 132 (e.g., a FIFO queue) as it awaits its transmission onto a transmission medium (e.g., a twisted-pair copper cable, a fiber optic cable, etc.) via network port 135 for delivery to its intended destination.

Similarly RX PPU 230 can be configured to receive inbound packets from the transmission medium via network port 136. For example, the received inbound packets can be placed in a receive queue of RX PPU 133 (not shown). RX PPU 133 can also be configured to manage the received packets in a manner similar to virtual switch 124. For example, RX PPU 133 can be configured to analyze the packets, modify the packets, drop the packets, return the packets to their sources, route the packets to their destinations, control the packets, etc.). As will be described in greater detail below, if RX PPU 133 determines that an inbound packet should be routed to its destination (e.g., one of VMs $122_1$-$122_N$), RX PPU 133 can be configured to place this packet in inbound queue 134 (e.g., a FIFO queue) for delivery to its intended destination.

As noted, the present invention recognizes that the implementation of congestion management in VMs $122_1$-$122_N$ or in virtual switch 124 of hypervisor 126 can be sub-optimal when considering the location of the reaction point. More particularly, it is recognized by the present invention that an implementation of the reaction point in NIC 130 would be advantageous.

Figure 2:
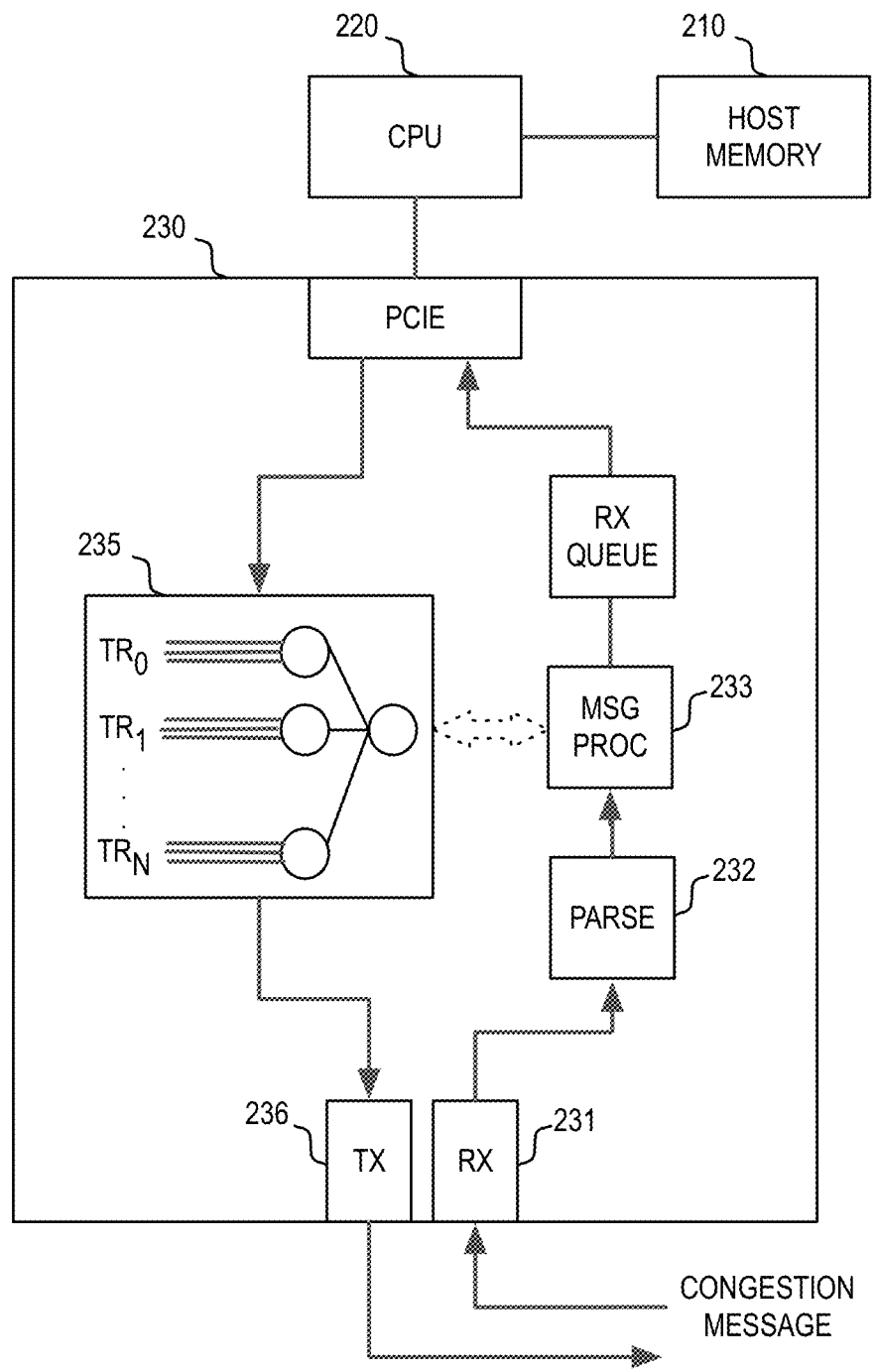
FIG. 2 illustrates an example embodiment of endpoint transmit queuing according to the present invention.

FIG. 2 illustrates an example embodiment of endpoint transmit queuing according to the present invention. In the block diagram illustration of FIG. 2, the endpoint transmit queuing is effected in an endpoint device that can be configured to implement a plurality of virtual machines for provision of network services for various clients. In this environment, host memory 210, CPU 220, and NIC 230 can represent embodiments of host memory 110, CPU 120, and NIC 130, respectively, that were described with reference to FIG. 1.

In the present invention, endpoint transmit queuing can be managed near the network port (e.g., in the NIC). This queuing can be effected using a transmit ring control structure. In general, the transmit ring control structure can be used to control which buffers are used to transmit packets to the media. Accordingly, the transmit rings can be configured to point to individual packet buffers elsewhere in memory.

As illustrated in FIG. 2, NIC 230 includes scheduler and shaper module 235. Scheduler and shaper module 235 can be configured to schedule and shape packets based on a plurality of transmit rings $TR_0$-$TR_N$. In the present invention, the endpoint transmit queuing process manages the separate transmit rings $TR_0$-$TR_N$, which can be directly assigned to a VM or can be dedicated to a VM, but its enqueuing access is mediated by a hypervisor provisioned device like a virtual switch. More generally, the various transmit rings $TR_0$-$TR_N$ can be used to interleave packets destined to any other endpoint, dedicated to packets that share a specific path (e.g., a network overlay tunnel), or dedicated to packets that are addressed to a specific physical or virtual destination address, etc.

In operation, scheduler and shaper module 235 can be configured to source traffic from the plurality of transmit rings $TR_0$-$TR_N$ in accordance with configured scheduling disciplines using multi-stage schedulers and shapers. It is a feature of the present invention that scheduler and shaper module 235 can be configured to operate in a feedback controlled loop fashion, wherein the state of scheduler and shaper module 235 is dynamically modified based on the arrival of a congestion message received on receiver 231 of NIC 230. As would be appreciated, various types of congestion messages can be used to effect the feedback mechanism of the present invention. In various examples, the congestion message can be a congestion notification message from downstream switches (backwards notification), congestion marking information that is inserted in the forward path and returned by transport layer marks in either ACKs or dedicated endpoint congestion notification messages, local burst detection machinery implemented within downstream blocks of the same device, explicit scheduler changes requested by hypervisor control endpoints in response to their policy enforcement function on receive, etc. In general, any information made available to scheduler and shaper module 235 that provides an indication of a need to modify the scheduling discipline of scheduler and shaper module 235 can be used as a congestion message in the endpoint transmit queuing process of the present invention.

In the example of FIG. 2, a congestion message can be received at receiver 231, parsed at parser module 232 and processed by message processing module 233. The received congestion message can then be used by scheduler and shaper module 235 to effect a change of state of the scheduling discipline of scheduler and shaper module 235. For example, if a congestion message is received that indicates that a particular endpoint, path, physical or virtual destination address is congested, then scheduler and shaper module 235 can modify the scheduling discipline such that the scheduling of packets from a particular transmit ring $TR_0$-$TR_N$ is modified such that the queuing of those packets for transmission by transmitter 236 is delayed or paced.

As this process illustrates, the reaction point control relative to congestion management has been moved closer to the network port, as compared to congestion management located in the VMs or the virtual switch in the hypervisor. New functionality has therefore been embodied in a network interface.

In one embodiment, a mechanism can be included to change the assignment of transmit rings to virtual machine transmit queues. This change in assignment can be implemented as a function of the feedback received and can be completely opaque to the enqueuing entity. This can occur, for example, when specific traffic needs to transition from a shared interleaved transmit ring to its own dedicated transmit ring. In one example, the mechanism can be embodied in a packet classifier that is applied at transmit DMA fetch time, whose result determines the actual transmit ring the packet is serviced by. In another example, the mechanism is based on post enqueuing notification that a particular flow needs to be enqueued to a specific transmit ring while relying on the enqueuing entity to actually change its selection, yet verifying the correctness of the change on subsequent packets.

Figure 3:
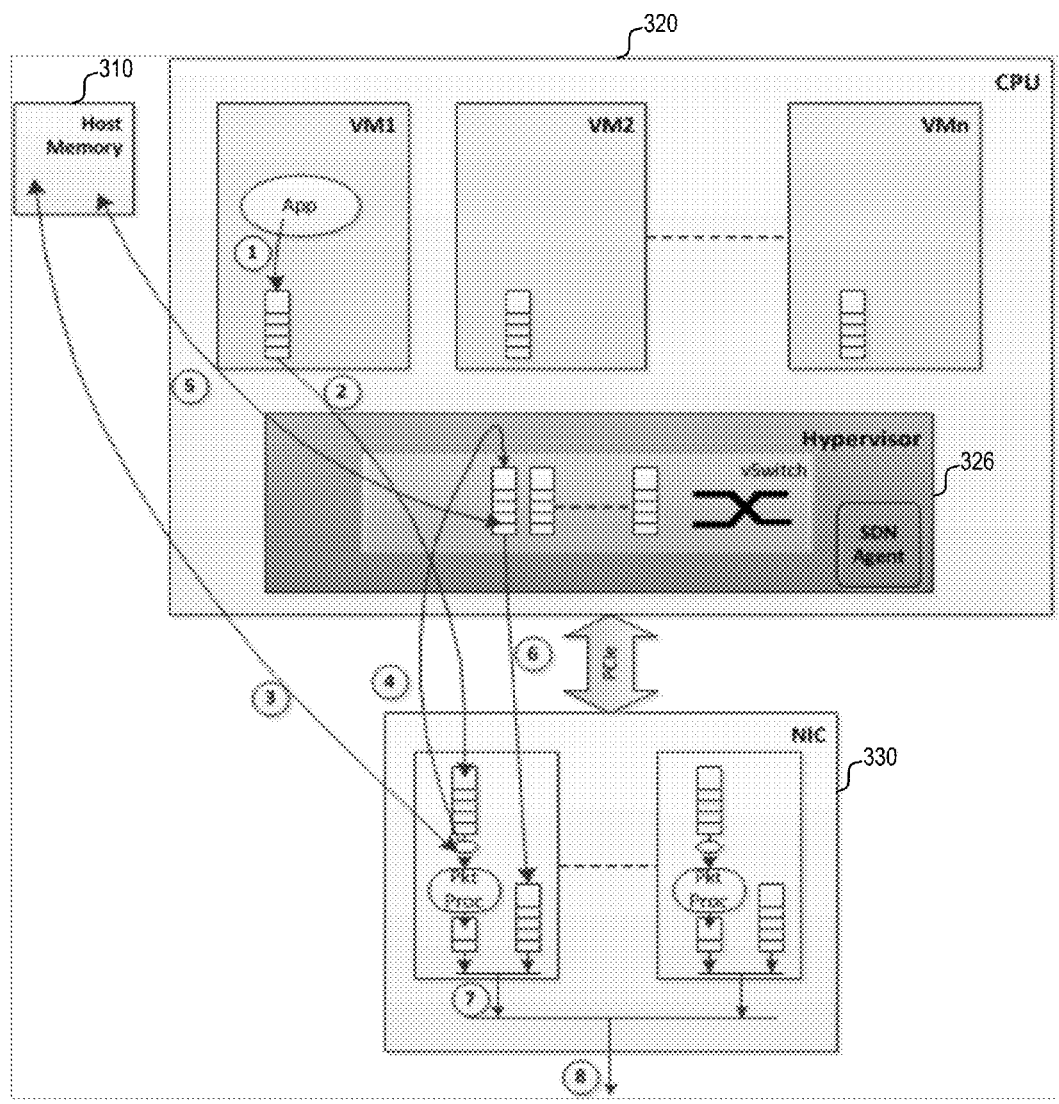
FIG. 3 illustrates an example embodiment of transmit queuing in a virtualized network interface according to the present invention.

FIG. 3 illustrates an example embodiment of transmit queuing in a virtualized network interface according to the present invention. In the block diagram illustration of FIG. 3, the endpoint transmit queuing is effected in an endpoint device that can be configured to implement a plurality of virtual machines for provision of network services for various clients. In this environment, host memory 310, CPU 320, and NIC 330 can represent embodiments of host memory, CPU, and NIC, that were described with reference to FIGS. 1 and 2.

In this illustrated example of the flow of a packet for transmission, the process begins when an application in VM1 places an indicator (e.g., header, memory address, etc.) of a packet in a transmit queue, as illustrated by arrow 1. A TX PPU in NIC 330 can then receive this indicator directly from the transmit queue (bypassing the virtual switch), as illustrated by arrow 2.

If it is determined that the packet can be scheduled for transmission, then the TX PPU can be configured to retrieve the payload of the packet from host memory 310, as illustrated by arrow 3. The TX PPU can then be configured to place the packet (e.g., both the header and the payload) into the outbound queue. When the packet drops out of the outbound queue, as illustrated by arrow 7, the packet can then be placed onto the transmission medium via the network port, as illustrated by arrow 8, so that the packet may be transmitted to its destination.

Alternatively, if it is determined that the packet is not ready to be scheduled for transmission, then the TX PPU can provide the indicator to a queue in the virtual switch in hypervisor 326, as illustrated by arrow 4. The payload of the packet can also be retrieved from host memory 310, as illustrated by arrow 5. At this point, the packet has effectively been requeued at the virtual switch.

When it is determined by the virtual switch that the packet can be scheduled for transmission, then the TX PPU can be configured to retrieve the packet from the virtual switch and place the packet (e.g., both the header and the payload) into the outbound transmit queue, as illustrated by arrow 6. When the packet drops out of the outbound transmit queue, as illustrated by arrow 7, the packet can then be placed onto the transmission medium via the network port, as illustrated by arrow 8, so that the packet may be transmitted to its destination.

As has been described, the process of queuing of packets in the NIC 330 is under the control of a scheduler and shaper module, which is designed to effect a reaction control near the network port and is mediated by a hypervisor provisioned device. In effect, the transmit queuing of the present invention extends the policy and congestion control up into system memory queues to avoid blocking. It is a feature of the present invention that the system memory queues have the granularity of device queues serviced with separate DMA channels, without requiring shared physical queues inside the NIC. Resources for lossless services can therefore be separated from other resources so that lossless service backpressure does not block other services.

Figure 4:
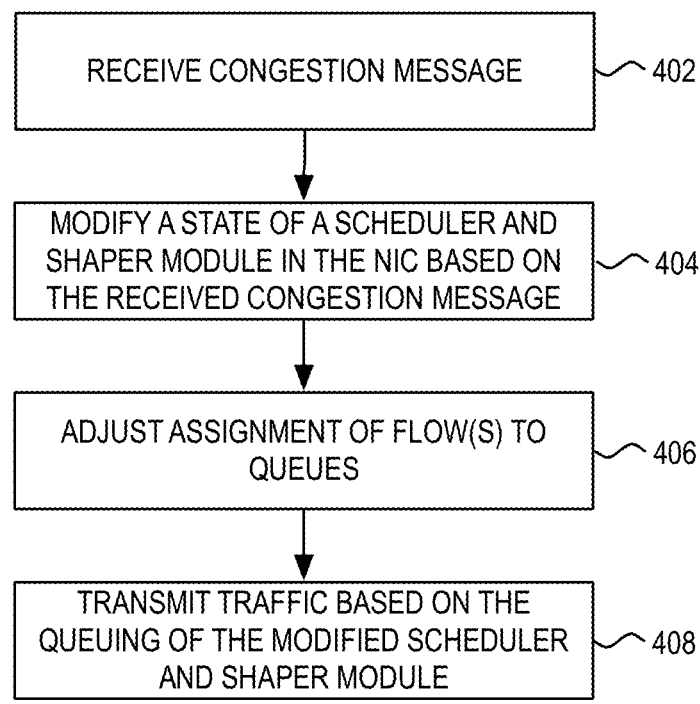
FIG. 4 illustrates a flowchart of an example transmit queuing process of the present invention.

As noted, the TX PPU can be configured to monitor congestion in the network, and may determine whether a change in the scheduling discipline of outbound packets is warranted. FIG. 4 illustrates a flowchart of an example transmit queuing process of the present invention that implements congestion monitoring near the network port.

As illustrated, the process begins at step 402 where a congestion message is received. A noted above, the congestion message can be an indication of network congestion, a result of burst detection, a result of policy enforcement, etc. Based on the receipt of a congestion message, the state of a scheduler and shaper module in the NIC can be modified at step 404. Additionally, at step 406, the assignment of flow(s) to queues can optionally be adjusted. In one example, the associated flow(s) can be moved to their own separate queues with their own scheduler policy, instead of adjusting the queue whether the flow(s) already reside with other flow(s). Based on the modification of the state of the scheduler and shaper module and possible adjustment of assignment of flow(s) to queues in the NIC, traffic can be transmitted, at step 406, based on the traffic queuing of the modified scheduler and shaper module. In this manner, the congestion reaction point can be moved near the network port.

Figure 5:
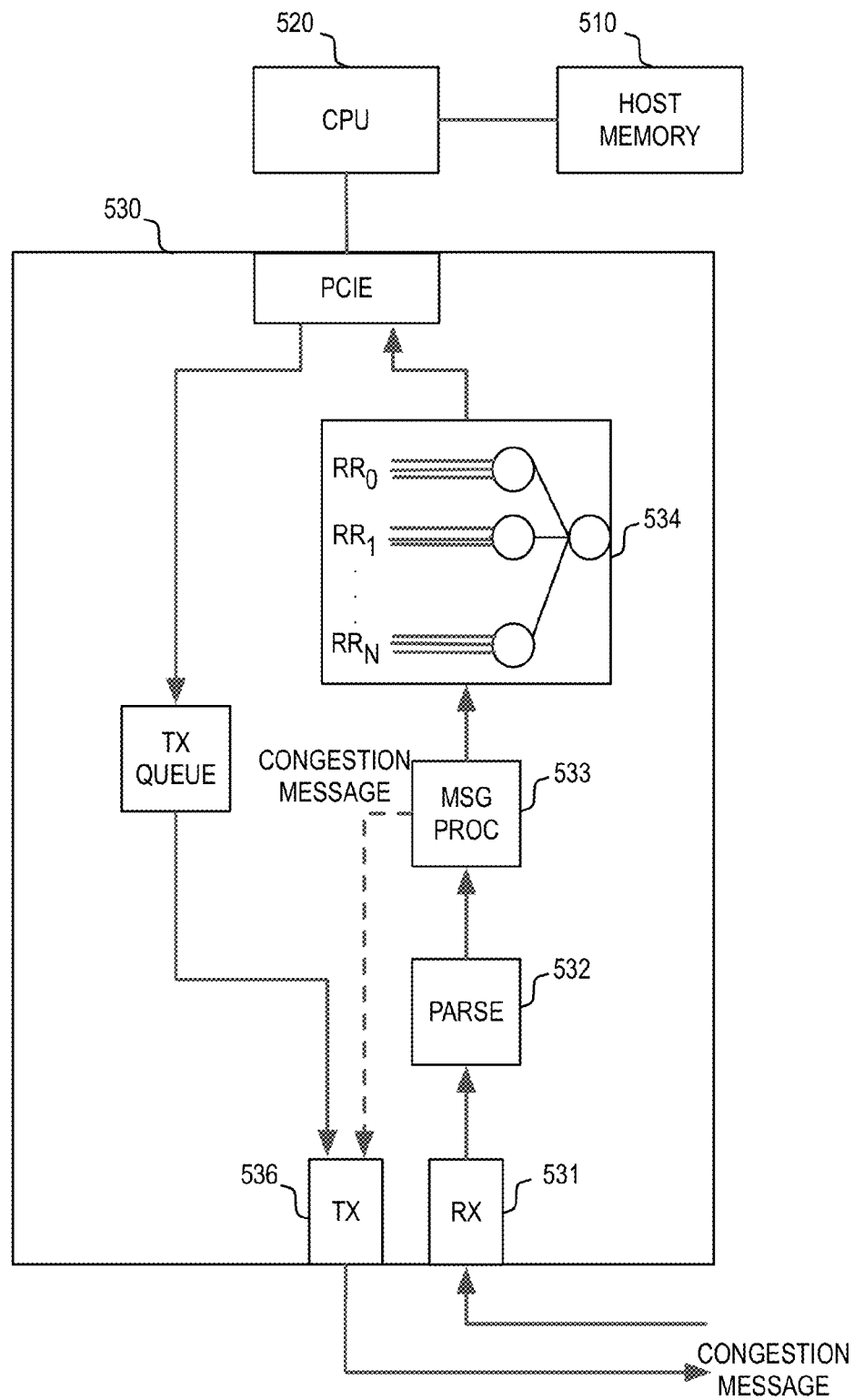
FIG. 5 illustrates an example embodiment of endpoint receive queuing according to the present invention.

FIG. 5 illustrates an example embodiment of endpoint receive queuing according to the present invention. In the block diagram illustration of FIG. 5, NIC 530 can represent an embodiment of NIC 130, which as described with reference to FIG. 1. In the present invention, endpoint receive queuing can also be managed near the network port (e.g., in the NIC). This receive queuing can be effected using a receive ring control structure. In general, the receive ring control structure can be used to control which buffers are used to receive packets from the media. Accordingly, the receive rings can be configured to point to individual packet buffers elsewhere in memory.

As illustrated in FIG. 5, NIC 530 includes scheduler and shaper module 534. Scheduler and shaper module 534 can be configured to schedule and shape packets based on a plurality of receive rings $RR_0$-$RR_N$. In the present invention, the endpoint receive queuing process manages the separate receive rings $RR_0$-$RR_N$, which can be directly assigned to a VM or can be dedicated to a VM, but its dequeuing access is mediated by a hypervisor provisioned device like a virtual switch. More generally, the various receive rings $RR_0$-$RR_N$ can be used to interleave packets that share a common endpoint, dedicated to packets that share a specific path, or dedicated to packets that share a specific physical or virtual destination address, etc. It should be noted that receive queue selection can be accomplished by packet classification hardware that identifies an individual receive ring or a group of receive rings as the targets associated with a received packet header. Packet classification can be based on individual flows or aggregate information that encompasses more than a single flow.

In operation, scheduler and shaper module 534 can be configured to meter traffic to the plurality of receive rings $RR_0$-$RR_N$ in accordance with configured scheduling disciplines using multi-stage schedulers and shapers. It is a feature of the present invention that scheduler and shaper module 534 can be configured to support metering of traffic such that feedback messages can be generated for delivery to traffic sources. As would be appreciated, various types of congestion messages can be used to effect the feedback mechanism of the present invention.

In the example of FIG. 5, traffic can be received at receiver 531, parsed at parser module 532 and processed by message processing module 533. The received traffic can then be processed using scheduler and shaper module 534 to effect a routing of traffic to receive queues in the VMs. Based on the metering of traffic (e.g., counters for bytes, packets, etc.) by scheduler and shaper module 534, congestion messages can then be generated for transmission by transmitter 536 for delivery to traffic sources. For example, if the traffic received from a particular traffic source exceeds a metering threshold, then a congestion message can be generated for transmission to the traffic source to indicate that network congestion exists. As would be appreciated, the state of scheduler and shaper module 534 can also be modified dynamically.

As this receive queuing process illustrates, the reaction point control relative to congestion management has again been moved closer to the network port. New functionality has therefore been embodied in a network interface.

Figure 6:
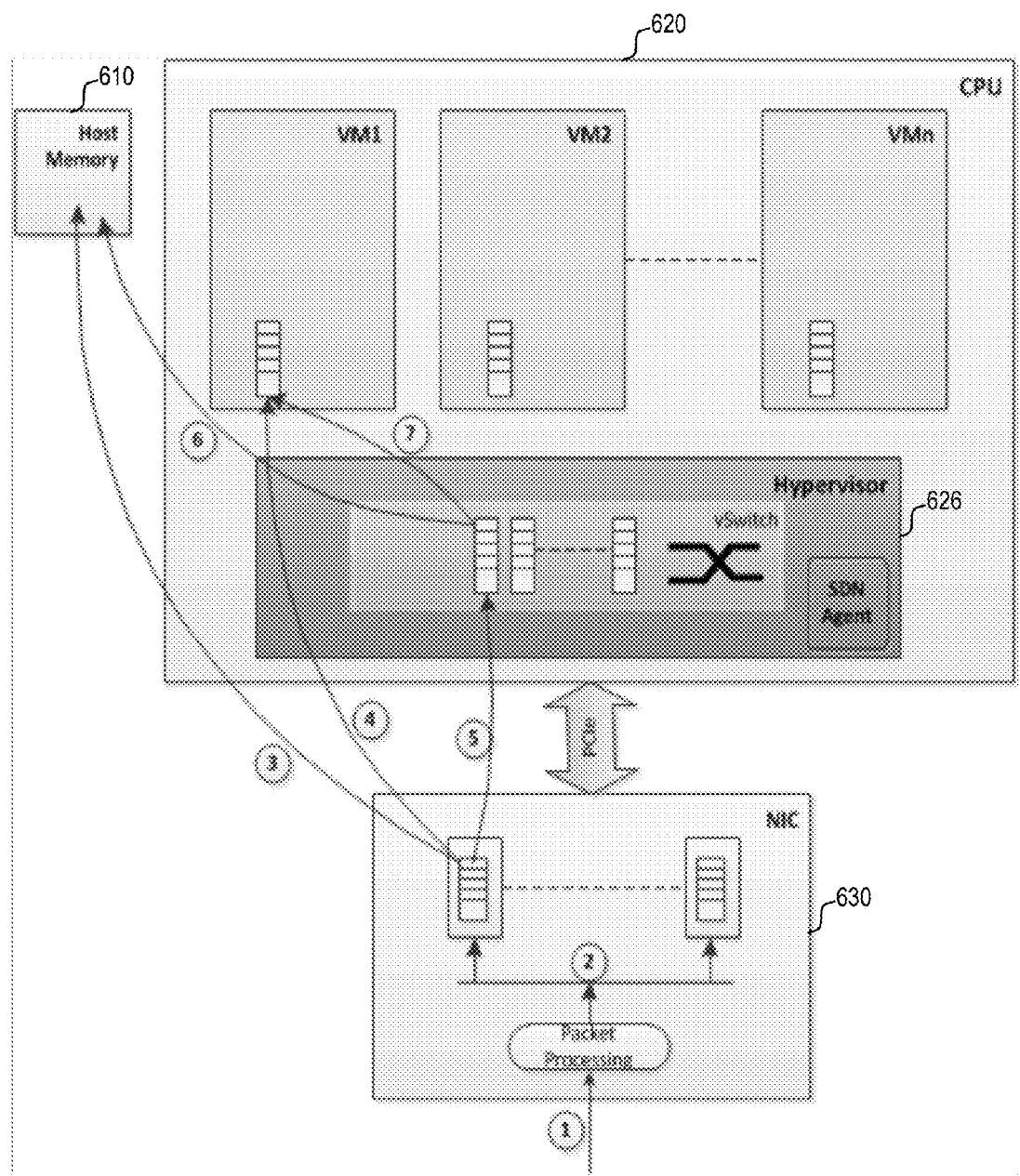
FIG. 6 illustrates an example embodiment of receive queuing in a virtualized network interface according to the present invention.

FIG. 6 illustrates an example embodiment of receive queuing in a virtualized network interface according to the present invention. In the block diagram illustration of FIG. 6, the endpoint receive queuing is effected in an endpoint device that can be configured to implement a plurality of virtual machines for provision of network services for various clients. In this environment, host memory 610, CPU 620, and NIC 630 can represent embodiments of host memory, CPU, and NIC, that were described with reference to FIGS. 1 and 5.

In this illustrated example of the flow of a received packet, the process begins when a RX PPU receives a packet from the transmission medium via a network port, illustrated by arrow 1. This packet, for example, may have a VM as its intended destination. In one embodiment, the RX PPU may determine the intended destination of the packet and place the packet in one of the inbound queues, illustrated by arrow 2.

If it is determined that the packet can be scheduled for delivery to a destination VM, then the RX PPU can be configured to delivery the payload to host memory 610, illustrated by arrow 3, while the indicator (e.g., header, memory address, etc.) is placed in a receive queue of VM1, illustrated by arrow 4. As this process illustrates the virtual switch can be bypassed.

In one example, it may be determined that the packet in the inbound queue is not ready to be scheduled for delivery to a VM either based on congestion or on policy criteria. In this scenario, the RX PPU can deliver the packet to a receive queue in the virtual switch of hypervisor 626. When the packet is ready to be delivered to a VM destination, then the virtual switch can be configured to deliver the payload to host memory 610, illustrated by arrow 6, while the indicator (e.g., header, memory address, etc.) is placed in a receive queue of VM1, illustrated by arrow 7.

As has been described, the process of dequeuing of packets in NIC 630 is under the control of a scheduler and shaper module, which is designed to effect a reaction control near the network port and is mediated by a hypervisor provisioned device. In effect, the receive queuing of the present invention extends the policy and congestion control up into system memory queues to avoid blocking. Again, it is a feature of the present invention that the system memory queues have the granularity of device queues serviced with separate DMA channels, without requiring shared physical queues inside the NIC.

As noted, the RX PPU can be configured to meter traffic to determine whether network congestion messaging should be generated. As would be appreciated, these network congestion messages can be generated autonomously based on the congestion state observed via queues or marks in the receive direction.

Figure 7:
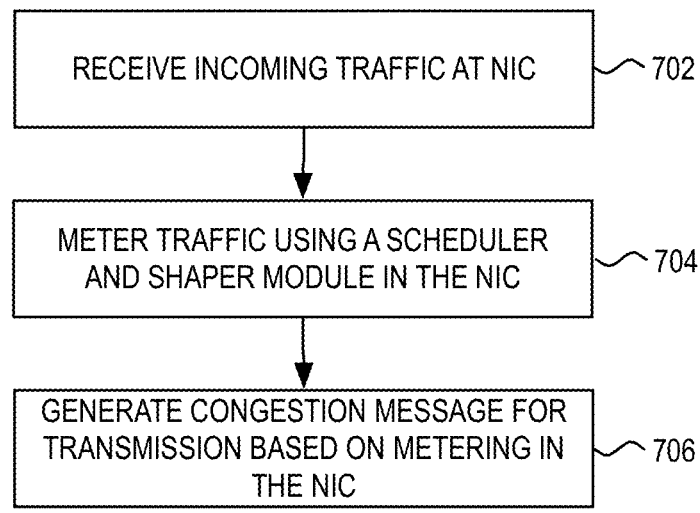
FIG. 7 illustrates a flowchart of an example receive queuing process of the present invention.

FIG. 7 illustrates a flowchart of an example receive queuing process of the present invention. As illustrated, the process begins at step 702 where incoming traffic is received at a NIC. At step 704, this incoming traffic can be metered using a scheduler and shaper module in the NIC. In one embodiment, the configured state of the scheduler and shaper module in metering the incoming traffic can be modified dynamically. At step 706, based on the metering of incoming traffic, a network congestion message can be generated for transmission to a traffic source. This generated congestion message can be used to modify the scheduling and shaping of traffic at the traffic source.

In one embodiment, the queuing mechanism described above can be used to support a split model where the queuing is done directly and efficiently by the VMs that operated as traffic source and sink, while the policy configuration is done and owned by a different entity (e.g., hypervisor), which is not directly sourcing or sinking the traffic. Dynamic policy changes and congestion responses can be assigned to yet another entity, represented by a combination of state machines and an embedded processor, which can ultimately be owned by the hypervisor, but operate autonomously in real time.

In one embodiment, the queuing mechanisms can be configured to accelerate the operation of a flow based or aggregate header virtual switch entity so that policy is enforced, packet processing is performed in terms of packet edits (e.g., NAT, tunnel, switching, and routing), yet the packets need not traverse any software path for that purpose.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
    receiving, by a transmit queue of a plurality of transmit queues of a network interface card, an indicator of a first packet from a first application executed by a computing device coupled to the network interface card;
    placing the first packet into the transmit queue of the plurality of transmit queues of the network interface card, responsive to receipt of the indicator;
    receiving a message at the network interface card, the message including information that enables identification of a congestion condition;
    determining, by a packet processor of the network interface card, that the first packet is not ready to be scheduled for transmission, responsive to receipt of the message including information that enables identification of the congestion condition;
    requeueing the first packet, from the transmit queue of the plurality of transmit queues of the network interface card, to a queue at a virtual switch executed by the computing device, responsive to the determination that the first packet is not ready to be scheduled for transmission;
    determining, by the packet processor, that the first packet can be scheduled for transmission;
    retrieving the first packet from the queue of the virtual switch, responsive to the determination that the first packet can be scheduled for transmission; and
    placing the retrieved first packet into the transmit queue of the plurality of transmit queues of the network interface card.

2. The method of claim 1, further comprising processing the received message in the packet processor in the network interface card.

3. The method of claim 1, wherein the plurality of transmit queues comprise a corresponding plurality of transmit rings, wherein each of the plurality of transmit rings is associated with one or more flows.

4. The method of claim 3, wherein requeueing the first packet at the virtual switch further comprises reassigning the first packet from a first transmit ring of the plurality of transmit rings associated with a first flow to a transmit ring of the virtual switch.

5. The method of claim 1, wherein requeueing the first packet at the virtual switch further comprises:
    forwarding a packet payload of the first packet from a host memory to a queue of the virtual switch, wherein the indicator of the first packet points to a buffer in the host memory where the packet payload of the first packet is stored.

6. The method of claim 1, further comprising:
    receiving, by the transmit queue of the network interface card, an indicator of a second packet from the first application, bypassing the virtual switch;
    determining, by the packet processor of the network interface card, that the second packet can be scheduled for transmission; and
    placing the second packet into the transmit queue of the plurality of transmit queues of the network interface card.

7. The method of claim 1, wherein the message includes congestion marking information contained in a dedicated congestion notification messages or in an acknowledgment message.

8. A method, comprising:
    receiving a packet at a network interface card, the packet placed by a packet processor into a receive queue of a plurality of receive queues of the network interface card;
    determining, by the packet processor, that the packet is not ready to be scheduled for delivery to an application executed by a computing device coupled to the network interface card, based on metering of congestion of the computing device by the packet processor;
    requeueing the packet, from the receive queue of the plurality of receive queues of the network interface card, to a receive queue of a virtual switch executed by the computing device, responsive to the determination that the packet is not ready to be scheduled for delivery;
    transmitting, by the network interface card based on the metering, a message that includes information that enables identification of a congestion condition to an upstream location;
    determining, by the packet processor, that the packet is ready to be delivered to an application of the computing device; and
    placing the packet into the receive queue of the plurality of receive queues of the network interface card, responsive to the determination that the packet is ready to be delivered, by:
        forwarding a packet payload of the packet from the receive queue of the virtual switch to a host memory of the computing device, and
        providing an indicator of the packet identifying a buffer in the host memory where the payload of the packet is stored to a receive queue of the application.

9. The method of claim 8, further comprising processing the received traffic in the packet processor in the network interface card.

10. The method of claim 8, wherein the plurality of receive queues comprise a corresponding plurality of receive rings, wherein each of the plurality of receive rings is associated with one or more flows.

11. The method of claim 10, wherein requeueing the packet further comprises reassigning the packet from a first receive ring associated with a first flow to a receive ring of the virtual switch.

12. The method of claim 8, further comprising:
    receiving a second packet at the network interface card;
    determining, by the packet processor of the network interface card, that the second packet can be delivered to the application; and
    placing the second packet into a receive queue of the application, bypassing the virtual switch.

13. A network interface card, comprising:
    a plurality of transmit queues, a first transmit queue of the plurality of transmit queues comprising a first packet of an application, executed by a computing device coupled to the network interface card, for transmission from the network interface card;
    a receiver configured to receive a message at the network interface card, the message including information that enables identification of a congestion condition; and
    a transmit packet processor configured to:
        determine that the first packet of an application is not ready to be scheduled for transmission, responsive to receipt of the message including information that enables identification of the congestion condition, requeue the first packet from the first transmit queue of a plurality of transmit queues of the network interface card to a virtual switch executed by the computing device, responsive to the determination that the first packet is not ready to be scheduled for transmission, determine that the first packet can be scheduled for transmission, retrieve the first packet from the virtual switch, responsive to the determination that the first packet can be scheduled for transmission, and place the retrieved first packet into the first transmit queue of the plurality of transmit queues of the network interface card.

14. The network interface card of claim 13, wherein the plurality of transmit queues comprise a corresponding plurality of transmit rings, wherein each of the plurality of transmit rings is associated with one or more flows.

15. The network interface card of claim 14, wherein the transmit packet processor is further configured to reassign the first packet from a first transmit ring of the plurality of transmit rings associated with a first flow to a transmit ring of the virtual switch.

16. The network interface card of claim 14, wherein the packet processor is further configured for:

determining that a second packet received from the first application, bypassing the virtual switch, can be scheduled for transmission; and placing the second packet into the transmit queue of the plurality of transmit queues of the network interface card.

17. The network interface card of claim 14, wherein the message includes congestion marking information contained in a dedicated congestion notification messages or in an acknowledgment message.

* * * * *